United States Patent
Basset et al.

(10) Patent No.: US 9,114,974 B2
(45) Date of Patent: Aug. 25, 2015

(54) PRESSURE-FILLING SYSTEM FOR FILLING A TANK, AND AN AIRCRAFT INCLUDING THE SYSTEM

(71) Applicant: AIRBUS HELICOPTERS, Marignane, Cedex (FR)

(72) Inventors: Gregory Basset, Martigues (FR); Lionel Lollini, Montvendre (FR)

(73) Assignee: Airbus Helicopters, Marignane Cedex (FR)

( * ) Notice: Subject to any disclaimer, the term of this patent is extended or adjusted under 35 U.S.C. 154(b) by 220 days.

(21) Appl. No.: 13/909,397

(22) Filed: Jun. 4, 2013

(65) Prior Publication Data
US 2013/0340887 A1 Dec. 26, 2013

(30) Foreign Application Priority Data
Jun. 20, 2012 (FR) ...................................... 12 01747

(51) Int. Cl.
*B67D 7/36* (2010.01)
*B64D 37/16* (2006.01)

(52) U.S. Cl.
CPC ................ *B67D 7/362* (2013.01); *B64D 37/16* (2013.01)

(58) Field of Classification Search
CPC ........ B64D 37/02; B64D 37/04; B64D 37/06; B64D 37/08; B64D 37/10; B64D 37/12; B64D 37/14; B64D 37/16; B64D 37/18; B64D 37/22; B64D 37/26; B64D 39/04; B64D 7/06; B64D 7/36; B64D 7/362; B64D 7/38; B64D 7/68; B64D 7/72; B64D 7/78; B67D 37/22; B67D 37/26

USPC ........... 141/37, 39, 40, 51, 54, 55, 59, 60, 94, 141/95, 192, 197, 198; 123/519, 520, 521; 137/511; 244/135 A, 135 R, 172.2, 244/172.3; 73/114.39

See application file for complete search history.

(56) References Cited

U.S. PATENT DOCUMENTS

| | | | | |
|---|---|---|---|---|
| 2,565,298 A * | 8/1951 | De Groat | ........................ | 141/66 |
| 3,144,056 A * | 8/1964 | Mosher | ........................ | 141/192 |
| 3,643,690 A * | 2/1972 | Sarai | ............................. | 137/587 |
| 3,929,155 A * | 12/1975 | Garretson | ..................... | 137/430 |
| 4,191,208 A * | 3/1980 | Mylander | ..................... | 137/393 |

(Continued)

FOREIGN PATENT DOCUMENTS

EP 2364911 A1 9/2011
FR 2731185 A1 9/1996

OTHER PUBLICATIONS

Search Report and Written Opinion; Application No. FR 1201747; dated Mar. 20, 2013.

*Primary Examiner* — Jason K Niesz
*Assistant Examiner* — Andrew Schmid
(74) *Attorney, Agent, or Firm* — Brooks Kushman P.C.

(57) ABSTRACT

A pressure-filling system (10) for filling a tank (2) and including a pressure-filling valve (11). The pressure-filling system (10) comprises a filling pipe (13) having a first end (13') that is connected to said pressure-filling valve (11), and a second end (13") that is connected to a check valve (14) that opens out into said tank (2), said filling pipe (13) being connected to a purge system (20) that opens out into said tank (2) so as to discharge a fluid contained in the filling pipe (13), said filling pipe (13) being connected to a branch pipe (15) that opens out to the open air (100) for dumping excess fluid from a tank in the event of excess pressure in the tank.

8 Claims, 1 Drawing Sheet

(56) References Cited

U.S. PATENT DOCUMENTS

| | | | |
|---|---|---|---|
| 4,328,844 A * | 5/1982 | Becktel et al. | 141/302 |
| 4,974,645 A * | 12/1990 | Johnson | 141/59 |
| 5,205,330 A * | 4/1993 | Sekine | 141/59 |
| 5,289,900 A * | 3/1994 | Aho et al. | 184/105.1 |
| 5,404,906 A * | 4/1995 | Aoshima et al. | 137/587 |
| 5,568,828 A * | 10/1996 | Harris | 141/348 |
| 5,570,672 A * | 11/1996 | Kunimitsu et al. | 123/516 |
| 5,590,697 A * | 1/1997 | Benjey et al. | 141/59 |
| 5,630,445 A * | 5/1997 | Horiuchi et al. | 137/592 |
| 5,819,796 A * | 10/1998 | Kunimitsu et al. | 137/587 |
| 6,044,873 A * | 4/2000 | Miller | 141/59 |
| 6,119,985 A * | 9/2000 | Clapp et al. | 244/171.4 |
| 6,244,287 B1 * | 6/2001 | Hill et al. | 137/2 |
| 6,253,802 B1 * | 7/2001 | Enge | 141/59 |
| 6,302,133 B1 * | 10/2001 | Kobayashi et al. | 137/43 |
| 6,443,335 B1 * | 9/2002 | Pinedjian et al. | 222/504 |
| 6,523,564 B1 * | 2/2003 | Phillips | 137/430 |
| 6,533,002 B1 * | 3/2003 | Kobayashi et al. | 141/302 |
| 6,581,649 B2 * | 6/2003 | Jursich | 141/5 |
| 6,648,030 B1 * | 11/2003 | Sparks | 141/59 |
| 6,782,926 B1 * | 8/2004 | Hughes | 141/98 |
| 6,863,095 B2 * | 3/2005 | Osaki et al. | 141/44 |
| 7,823,610 B2 * | 11/2010 | King | 141/303 |
| 7,967,039 B2 * | 6/2011 | McKee | 141/302 |
| 8,464,764 B1 * | 6/2013 | Milsom | 141/198 |
| 8,955,559 B2 * | 2/2015 | Hatakeyama et al. | 141/44 |
| 2001/0054452 A1 * | 12/2001 | Ozaki | 141/301 |
| 2002/0074058 A1 * | 6/2002 | Clemmons et al. | 141/301 |
| 2002/0170617 A1 * | 11/2002 | Veenstra et al. | 141/94 |
| 2003/0213527 A1 * | 11/2003 | Yanase et al. | 141/59 |
| 2007/0163672 A1 * | 7/2007 | Luntz et al. | 141/350 |
| 2008/0105329 A1 * | 5/2008 | Benjey | 141/59 |
| 2008/0173763 A1 * | 7/2008 | Morgia et al. | 244/135 R |
| 2010/0024904 A1 * | 2/2010 | Hoffman et al. | 137/561 R |
| 2010/0252006 A1 * | 10/2010 | Reddy | 123/519 |
| 2011/0315271 A1 * | 12/2011 | Carmona et al. | 141/98 |
| 2012/0216910 A1 * | 8/2012 | Inagi et al. | 141/4 |
| 2013/0019844 A1 * | 1/2013 | Kulkarni et al. | 123/520 |
| 2013/0098500 A1 * | 4/2013 | Mitrovich et al. | 141/95 |
| 2013/0221000 A1 * | 8/2013 | Iwaya et al. | 220/86.2 |
| 2013/0269532 A1 * | 10/2013 | Kimoto | 96/108 |
| 2013/0284150 A1 * | 10/2013 | Lollini | 123/446 |
| 2013/0320146 A1 * | 12/2013 | Basset | 244/135 C |
| 2013/0340887 A1 * | 12/2013 | Basset et al. | 141/51 |
| 2014/0076421 A1 * | 3/2014 | Kuehn et al. | 137/386 |
| 2014/0076457 A1 * | 3/2014 | Murray | 141/4 |
| 2014/0283920 A1 * | 9/2014 | Basset | 137/14 |
| 2014/0316589 A1 * | 10/2014 | Lichtash | 700/282 |
| 2015/0075136 A1 * | 3/2015 | Fan et al. | 60/274 |

* cited by examiner

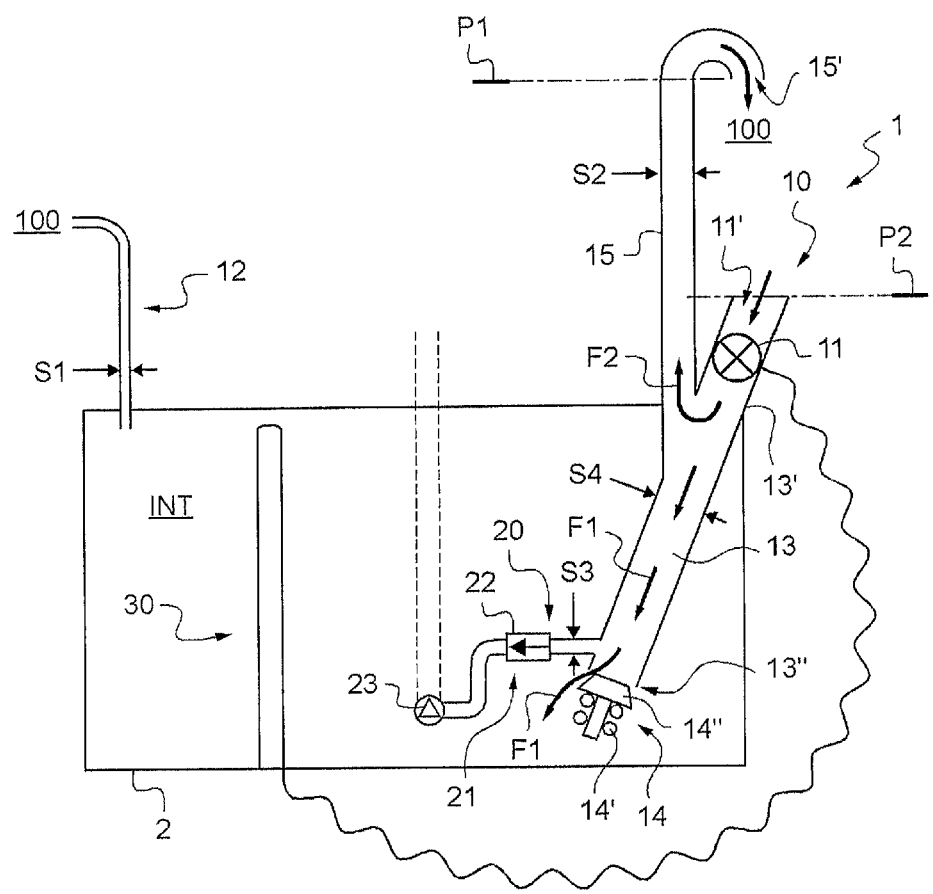

PRESSURE-FILLING SYSTEM FOR FILLING A TANK, AND AN AIRCRAFT INCLUDING THE SYSTEM

CROSS REFERENCE TO RELATED APPLICATIONS

This application claims priority to French patent application No. FR 12 01747 filed on Jun. 20, 2012, the disclosure of which is incorporated in its entirety by reference herein.

BACKGROUND OF THE INVENTION (1) Field of the Invention

The present invention relates to a pressure-filling system for filling a tank, and to a vehicle provided with the system. More particularly, the invention may be applied to an aircraft. However, it should be understood that the filling system may be adapted to any type of structure that includes a tank.

In particular, the invention applies to the technical field of pressure-filling systems that include a device for avoiding excess pressure in a tank.

(2) Description of Related Art

A tank may comprise a single container that is fed with fluid by the pressure-filling system. In a variant, the tank may comprise a plurality of interconnected containers, with at least one container being fed directly by the pressure-filling system.

An aircraft, and in particular a helicopter type rotorcraft, usually includes gravity filler means in order to fill a tank using rudimentary means, e.g. a simple pipe. Conventionally, gravity filler means comprise an inlet duct opening out to a screen so as to avoid filling the tank with all kinds of pollutant.

The drawback of such gravity filling lies in particular in the time taken for filling, which remains relatively long.

In parallel, the fuel-filling system is optionally provided with a pressure-filling valve.

Means for delivering fluid under pressure are then connected to the pressure-filling valve via a catch wheel so as to enable the tank to be filled very quickly. A tanker truck is usually used to fill the tank with a fluid under pressure.

Document EP 2 364 911 presents a mixed system making it possible to fill a tank under pressure or by gravity.

The pressure-filling valve may include a mechanical or automatic end-of-filling control device, so as to end pressure filling.

Such an automatic end-of-filling control device may comprise a gauge system for determining whether the volume of fuel in the tank has reached a predetermined threshold. Under such circumstances, if the threshold is reached, the pressure-filling valve is closed automatically.

Furthermore, the pressure-filling system may include a device for mitigating a failure of the end-of-filling control device.

In the event of a failure of the end-of-filling control device, the pressure of the fuel in the tank increases. Such a failure may thus lead to rupture of a container of the tank, or of the structure surrounding the tank, for example.

Furthermore, it is also possible to program the quantity of fuel to inject into a tank by using a programmer of a tanker truck. Malfunctioning of the programming may also lead to excess pressure in the tank.

A pressure-filling system may thus include a valve for limiting the pressure in the tank. Such a valve is sometimes referred to as a "pressure relief valve".

When the pressure existing in a tank reaches a threshold defined by the manufacturer, the pressure relief valve opens so as to avoid an incident.

However, it is sometimes difficult to arrange a pressure relief valve. For example, a pressure relief valve of an aircraft must be designed to comply with regulations relating to crash situations. It is therefore difficult to calibrate the pressure relief valve, since the pressure inside the tank might rise either as a result of a failure of an end-of-filling control device or as a result of a crash.

Furthermore, a pressure relief valve is rather bulky and must be inspected regularly.

Furthermore, a pressure relief valve itself might fail.

Document U.S. Pat. No. 5,289,900 describes a filling device that is provided with a pressure-filling valve that communicates with a tank by means of a pipe having reference "52".

Documents U.S. Pat. No. 3,643,690 and FR 2 731 185 are also known, and remote from the field of the invention.

BRIEF SUMMARY OF THE INVENTION

An object of the present invention is thus to propose an alternative pressure-filling system that seeks to avoid excess pressure in a tank.

In the invention, a pressure-filling system for filling a tank includes a pressure-filling valve. The pressure-filling system comprises a filling pipe having firstly a first end that is connected to the pressure-filling valve, and secondly a second end that is connected to a check valve that opens out into the tank. The filling pipe thus extends into a container of a tank.

Under such circumstances, the filling pipe is connected to a purge system that opens out into the tank so as to discharge a fluid contained in the filling pipe to the inside of the tank. Furthermore, the filling pipe is connected to a branch pipe that opens out to the open air for dumping excess fluid from a tank in the event of excess pressure in a tank.

Below, the expression "pipe" designates an assembly comprising at least one piece of piping. A pipe may thus comprise either a single piece of piping, or more than one piece of piping.

For example, during pressure filling of a fuel tank, the fuel passes through the pressure-filling valve, and then flows into the filling pipe. The fuel then passes through the check valve so as to spread out inside the tank.

When the desired fuel level is reached, filling of the tank is stopped.

The fuel present in the filling pipe may be discharged into the tank via the purge system. The filling pipe thus includes little or no fuel likely to escape from the vehicle via the branch pipe following the vehicle overturning, for example.

If filling continues while the tank is full, the pressure of the fuel in the tank increases. The fuel passing through the pressure-filling valve penetrates into the filling pipe, then flows into the branch pipe. The fuel is thus expelled from the vehicle, thereby making it possible to limit the pressure existing in the tank.

Furthermore, the check valve prevents fluid from flowing from the tank to the filling pipe, so as to avoid fluid being spilled if the vehicle overturns.

The invention thus proposes a pressure-filling system that does not have a pressure relief valve. Use thereof is thus optimized.

Furthermore, fluid is discharged to the outside of the tank merely via a pipe. The risks of the branch pipe becoming accidentally closed are minimal or non-existent.

The pressure-filling system may also be provided with one or more of the following characteristics. Each characteristic results from the same general inventive concept that tends to eliminate the pressure relief valve of the prior art.

Thus, the pressure-filling system may include a fuel gauge system, so as to cause said pressure-filling valve to close automatically when a fluid threshold is reached.

The gauge system may be connected directly to the pressure-filling valve, or indirectly via a processor unit. When the fluid level in the tank reaches said threshold, the pressure-filling valve is closed.

In the variant:

the pressure-filling valve interprets the information coming from the gauge system so as to close where appropriate; or the gauge system transmits a closure command to the pressure-filling valve if necessary; or a processor unit interprets the information coming from the gauge system, and then transmits a closure command to the pressure-filling valve if necessary.

In addition, the purge system may comprise a purge pipe that extends from the filling pipe to a tank.

The purge pipe thus extends into the tank so as to discharge a fluid that is contained in the filling pipe into the tank. If the branch pipe is at least partially filled with fluid, then while the filling pipe is purging, the fluid may flow into the filling pipe so as to be directed towards the tank via the purge system.

The purge pipe may be connected to a low point of the filling pipe.

Furthermore, the purge system possibly includes a check valve that is arranged on the purge pipe so as to prevent fluid from flowing from a tank to the filling pipe.

The purge pipe presents a purge section, the branch pipe presents a branch section, the purge section is smaller than the branch section.

It should be observed that the filling pipe may include a filling section that is larger than the purge and branch sections.

Furthermore, the purge system may include pump means, so as to cause fluid to flow within the purge pipe, from the filling pipe to a tank.

The pump means may include an existing pump, such as a feed pump directing the fuel from a tank towards an engine, or a transfer pump moving the fluid from one container to another container of the tank.

Starting up the pump means thus causes the filling pipe to purge.

In addition, the filling system possibly includes a vent pipe that connects the tank to the open air so as to discharge vapors, in particular fuel vapors.

The vent pipe presents a vent section, the branch pipe presents a branch section, the vent section is smaller than the branch section.

When the tank is full, the fuel thus preferably flows into the branch pipe and not into the vent pipe.

In addition to a pressure-filling system, the invention relates more specifically to a vehicle provided with a tank. The vehicle thus includes a pressure-filling system of the invention.

BRIEF DESCRIPTION OF THE SEVERAL VIEWS OF THE DRAWINGS

The invention and its advantages appear in greater detail in the context of the description below of embodiments given by way of illustration and with reference to the accompanying sole FIGURE.

FIG. 1 shows a vehicle 1 provided with a tank 2 such as an aircraft. The FIGURE shows only the members that make it possible to understand the invention, so as not to overload it unnecessarily.

DETAILED DESCRIPTION OF THE INVENTION

The tank 2 that is shown comprises a single container. However, the tank may be provided with a plurality of containers that communicate, e.g. in pairs.

In order to fill the tank 2 quickly with a fluid such as fuel, the tank 2 is provided with a pressure-filling system 10.

The pressure-filling system 10 is provided with a pressure-filling valve 11.

Furthermore, the pressure-filling system includes a filling pipe 13 that extends the pressure-filling valve to the inside INT of the tank. The filling pipe 13 thus extends from a first end 13' that is connected to the pressure-filling valve 11 to a second end 13".

The filling pipe 13 further presents a "filling section" S4. The filling pipe may be a cylinder having a filling section S4 that is constant and circular.

In particular, the pressure-filling pipe 13 may be secured to the pressure-filling valve 11, or it may be fastened to an outlet orifice of the pressure-filling valve 11 by conventional means.

The pressure-filling system 10 is further provided with a check valve 14 that is arranged on the filling pipe. The check valve 14 closes the second end 13" of the filling pipe 13 so as to prevent a fluid from flowing from the inside INT of the tank into the filling pipe via the second end 13". However, the check valve does not prevent a fluid from flowing from the filling pipe into the inside INT of the tank via the second end 13", or, at the least, it does not prevent a fluid from flowing from the filling pipe into the inside INT of the tank via the second end 13" as from a threshold filling pressure.

Under such circumstances, the check valve 14 is fastened to the filling pipe, opening out firstly into the inside of the filling pipe, and secondly into the inside INT of the tank.

The check valve 14 may include a spring 14' that tends to cause a closure surface 14" to bear against the second end 13". The spring 14' is rated so as to allow fluid to pass from the filling pipe to the tank under pressure-filling conditions.

In addition, the pressure-filling system 10 includes a branch pipe 15. The branch pipe 15 presents a "branch section" S2. By way of example, the branch pipe comprises a tube having a section that is constant and circular, and it opens out to the open air by means of a bent spout.

The branch section S2 may thus be smaller than or equal to the filling section S4. However, the branch section S2 presents a flow-passing area that is large, so as to generate little headloss.

It should be observed that the term "section that is smaller than" is used to designate a section that presents a flow-passing area for fluid that is smaller than the flow-passing area of another section.

For example, the filling pipe presents a circular section having a diameter that is greater than a diameter of a circular section of the branch pipe.

Furthermore, the branch pipe extends from the filling pipe 13 to the open air 100. Under such circumstances, the branch pipe connects the inside of the filling pipe to the open air. The branch pipe may be fastened to the filling pipe in the immediate proximity of the first end 13', namely as close as possible to the first end 13'.

Preferably, the branch pipe 15 extends upwards from the filling pipe. The outlet 15' of the branch pipe 15 to the open air 100 is thus contained in a branch plane P1. The inlet 11' of the filling valve is contained in filling plane P2, and the branch plane P1 is above the filling plane P2.

By way of example, during pressure filling of fuel, the fuel penetrates into the pressure-filling valve 11, then passes through the filling pipe 13 and the check valve 14, along arrows F1, so as to fill the tank.

When the tank is full, the pressure existing inside the tank would increase if filling were to continue unduly. Fuel would then continue to pass through the pressure-filling valve 11, and fill the filling pipe 13. Fuel would thus overflow into the branch pipe 15 so as to reach the outside of the tank. The pressure inside the tank 10 can thus be maintained below a threshold.

At the end of pressure filling, fluid may remain in the filling pipe 13. Depending on the movements of the vehicle, the fluid might flow to the outside via the branch pipe.

In order to avoid this phenomenon, the pressure-filling system 10 is provided with a purge system 20, so as to drain any fluid contained in the filling pipe 13 into the tank 2.

By way of example, the purge system is fitted with a purge pipe 21 that is connected to the filling pipe 13. The purge pipe may be situated in the proximity of the second end 13" of the filling pipe 13 and it extends into the tank 2. The purge pipe is thus connected to a low point of the filling pipe.

Furthermore, the purge pipe may possess a "purge section" S3. The purge section S3 may be smaller than the filling section S4.

Furthermore, the purge system 20 shown diagrammatically in the FIGURE includes a check valve 22. The check valve 22 is arranged in an intermediate portion of the purge pipe 21, the intermediate portion being arranged between the two ends of the purge pipe. The check valve prevents fluid from flowing from the inside INT of the tank into the filling pipe 13.

By way of example, the check valve may be provided with a ball. The ball closes a flow orifice of the valve under the pressure of a fluid coming from the tank, but frees the flow orifices under the pressure of a fluid coming from the filling pipe 13.

In order to encourage discharge of fluid from the filling pipe, the purge system 20 may include pump means 23, so as to cause fluid to flow within said purge pipe 21 from the filling pipe 13.

By way of example, the pump means 23 comprise a pump that is used for other purposes, such as a feed pump delivering fuel to an engine, or a transfer pump for transferring a fluid from one container to another container.

In addition, the invention is particularly useful in the context of an automatic filling system.

The pressure-filling system then includes a gauge system 30 for determining the volume of fluid in a tank. The pressure-filling valve thus closes when that volume reaches a threshold.

The invention makes it possible to mitigate a malfunctioning of the gauge system by avoiding damaging excess pressure in the tank.

Furthermore, the pressure-filling system may include a vent pipe 12 that connects a tank to the open air 100.

The vent pipe presents a vent section S1. By way of example, the vent pipe is a tube having a section that is constant and circular.

The vent section S1 is thus smaller than the branch section S2. By way of example, the vent section S1 presents a small diameter.

The small diameter generates significant headloss, unlike the headloss generated by the branch pipe. However, the small diameter does not have an impact on the venting function of the vent pipe 12.

In the event of excess pressure in the tank during pressure filling, the fuel is discharged via the branch pipe and not via the vent pipe 12.

Naturally, the present invention may be subjected to numerous variations as to its implementation. Although several embodiments are described above, it should readily be understood that it is not conceivable to identify exhaustively all possible embodiments. It is naturally possible to envisage replacing any of the means described by equivalent means without going beyond the ambit of the present invention.

What is claimed is:

1. A pressure-filling system for filling a tank, said system comprising a filling pipe having a first end that is connected to a pressure-filling valve, and a second end that is connected to a check valve, the filling pipe being connected to a purge system that opens into the tank so as to be able to discharge a fluid contained in the filling pipe, the filling pipe being connected to a branch pipe that is in connection with open air in order to be able to discharge excess fluid in the event of excess pressure in the tank.

2. The pressure-filling system according to claim 1, further comprising a gauge system that is suitable for determining the volume of fluid in the tank, so as to cause the pressure-filling valve to close automatically when a fluid threshold is reached.

3. The pressure-filling system according to claim 1, wherein the purge system comprises a purge pipe that extends from the filling pipe to the tank.

4. The pressure-filling system according to claim 3, wherein the purge system includes a check valve that is arranged on the purge pipe so as to prevent fluid from flowing from the tank to the filling pipe.

5. The pressure-filling system according to claim 3, wherein the purge system includes pump means, so as to cause fluid to flow within the purge pipe, from the filling pipe to a tank.

6. The pressure-filling system according to claim 1, wherein the filling system includes a vent pipe having a vent section having a first diameter, the branch pipe having a branch section having a second diameter, the first diameter being smaller than the second diameter.

7. A vehicle including the pressure-filling system according to claim 1.

8. The pressure-filling system according to claim 3, wherein the purge system includes a pump, so as to cause fluid to flow within the purge pipe, from the filling pipe to a tank.

* * * * *